United States Patent
Malakapalli et al.

(10) Patent No.: US 10,146,566 B2
(45) Date of Patent: Dec. 4, 2018

(54) ENABLING VIRTUAL DESKTOP CONNECTIONS TO REMOTE CLIENTS

(75) Inventors: Meher P. Malakapalli, Sammamish, WA (US); Ido Ben-Shachar, Kirkland, WA (US); Mahadeva K. Alladi, Redmond, WA (US); Vadim Ponomarev, Bellevue, WA (US); Ersev Samim Erdogan, Seattle, WA (US); Ashwin Palekar, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 846 days.

(21) Appl. No.: 12/643,892

(22) Filed: Dec. 21, 2009

(65) Prior Publication Data

US 2011/0153716 A1 Jun. 23, 2011

(51) Int. Cl.
*G06F 9/455* (2018.01)
*G06F 9/50* (2006.01)
*G06F 9/451* (2018.01)

(52) U.S. Cl.
CPC .......... *G06F 9/45533* (2013.01); *G06F 9/452* (2018.02); *G06F 9/505* (2013.01)

(58) Field of Classification Search
CPC . G06F 2009/45533; G06F 2009/45575; G06F 2009/45595
USPC ........................................................ 709/203
See application file for complete search history.

(56) References Cited

U.S. PATENT DOCUMENTS

| | | | |
|---|---|---|---|
| 6,349,337 B1* | 2/2002 | Parsons, Jr. .......... | G06F 9/4443 709/227 |
| 6,922,724 B1* | 7/2005 | Freeman et al. ............... | 709/223 |
| 2005/0198303 A1* | 9/2005 | Knauerhase et al. .......... | 709/227 |
| 2007/0260702 A1* | 11/2007 | Richardson et al. .......... | 709/217 |
| 2008/0034408 A1 | 2/2008 | Duggal | |
| 2008/0201455 A1* | 8/2008 | Husain ......................... | 709/220 |
| 2008/0270612 A1 | 10/2008 | Malakapalli et al. | |
| 2009/0006537 A1* | 1/2009 | Palekar et al. ................ | 709/203 |
| 2009/0216975 A1 | 8/2009 | Halperin et al. | |
| 2009/0248869 A1 | 10/2009 | Ghostine | |
| 2011/0004680 A1* | 1/2011 | Ryman ......................... | 709/224 |

OTHER PUBLICATIONS

Rouse, P., Virtual Desktop Infrastructure (VDI) Overview, Dec. 20, 2006, 5 pages, downloaded at http://www.msterminalservices.org/articles/Virtual-Desktop-Infrastructure-Overview.html.
Microsoft Virtual Desktop Infrastructure (VDI) FAQ, Dec. 17, 2008, 6 pages, downloaded at http://download.microsoft.com/download/2/E/3/2E303AAA-4217-4E67-9ABC-B7FEADC86640/VECD%20VDI%20FAQ%20dec2008.pdf.

(Continued)

*Primary Examiner* — John M MacIlwinen
(74) *Attorney, Agent, or Firm* — Baker & Hostetler LLP

(57) ABSTRACT

Disclosed are techniques for providing a platform that allows a user to remotely establish a connection with a virtual machine operating on a server farm In a typical scenario, when a user requests for a connection to access third party plug-in applications, the application program interface may interact with the session broker process to identify sessions or suitable servers to which the user can be connected. The user may access the third party plug-in applications through the identified sessions or suitable servers.

19 Claims, 11 Drawing Sheets

(56) References Cited

OTHER PUBLICATIONS

Keartland, A., Windows 2008 R2—Remote Desktop Services: VDI—RD Connection Broker, RD Virtualization Host Drilldown, 2009, 20 pages, downloaded at http://download.microsoft.com/download/6/7/3/673B71D0-6D4F-4591-9940-D33DF9135487/VIR303_Remote_desktop_services_Keartland.pptx.

Using the Remote Desktop Virtualization API, Oct. 12, 2009, 1 pages, downloaded at http://msdn.microsoft.com/en-us/library/ee351750(VS.85).aspx.

* cited by examiner

ENABLING VIRTUAL DESKTOP CONNECTIONS TO REMOTE CLIENTS

BACKGROUND

Remote computing systems may enable users to access resources hosted by the remote computing systems. Servers on the remote computing systems can execute programs and transmit signals indicative of a user interface to clients that can connect by sending signals over a network conforming to a communication protocol such as the TCP/IP protocol. Each connecting client may be provided a session, i.e., an execution environment that includes a set of resources. Each client can transmit signals indicative of user input to the server and the server can apply the user input to the appropriate session. The clients may use protocols such as the Remote Desktop Protocol (RDP) to connect to a server resource. Protocols such as RDP typically handle graphics, device traffic such as USB, printer keyboard and mouse and in addition, virtual channels for application between server and a client. The terminal server hosts client sessions which can be in hundreds in a typical server configuration.

Enabling remote connections to centralized desktops hosted in virtual machines is commonly used for centralized computing scenarios. Deployment of virtual desktops requires load balancing of host computers that host virtual machines, placement of virtual machines on the hosts, and properly orchestrating the startup, wake up, and preparation of virtual machines for receiving connections.

SUMMARY

Aspects of the invention are embodied in a system adapted to connect a client computing device to one of a plurality of virtual machines executing on a plurality of servers. The system preferably has a redirector module that receives a request from a user of the client computing device and, in turn, sends a request for a redirection packet for redirecting the client computing device to a target destination. The system also preferably has a broker module that receives the request and determines a selected virtual machine hosted on a server to which the user has a preexisting virtual machine session. Then the name of the virtual machine and an internet protocol (IP) address identifying the selected virtual machine as the target destination is determined. A redirection packet including the IP address is sent to the client computing device along with the name of the virtual machine to permit the client computer device to connect to and authenticate the virtual machine. The selected virtual machine may be maintained on a server in a server farm. The virtual machine may be in an inactive state and need to be restored (e.g., the server may need to wake up the virtual machine and prepare it to receive a connection) on the server prior to execution. The broker module maintains a cache of user sessions based on information that is received from the servers that allows it to track all of the preexisting virtual machine sessions.

DETAILED DESCRIPTION OF ILLUSTRATIVE EMBODIMENTS

Certain specific details are set forth in the following description and figures to provide a thorough understanding of various embodiments of the inventions. Certain well-known details often associated with computing and software technology are not described in the following disclosure for the sake of clarity. Furthermore, those of ordinary skill in the relevant art will understand that they can practice other embodiments of the disclosed subject matter without one or more of the details described below. While various methods are described with reference to steps and sequences in the following disclosure, the description as such is for providing a clear implementation of embodiments of the disclosed subject matter, and the steps and sequences of steps should not be taken as required to practice the invention.

It should be understood that the various techniques described herein may be implemented in connection with hardware or software or, where appropriate, with a combination of both. Thus, the methods and apparatus disclosed herein, or certain aspects or portions thereof, may take the form of program code (i.e., instructions) embodied in tangible media, such as floppy diskettes, CD-ROMs, hard drives, or any other machine-readable storage media that may be loaded into and executed by a machine, such as a computer. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosed subject matter, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1:
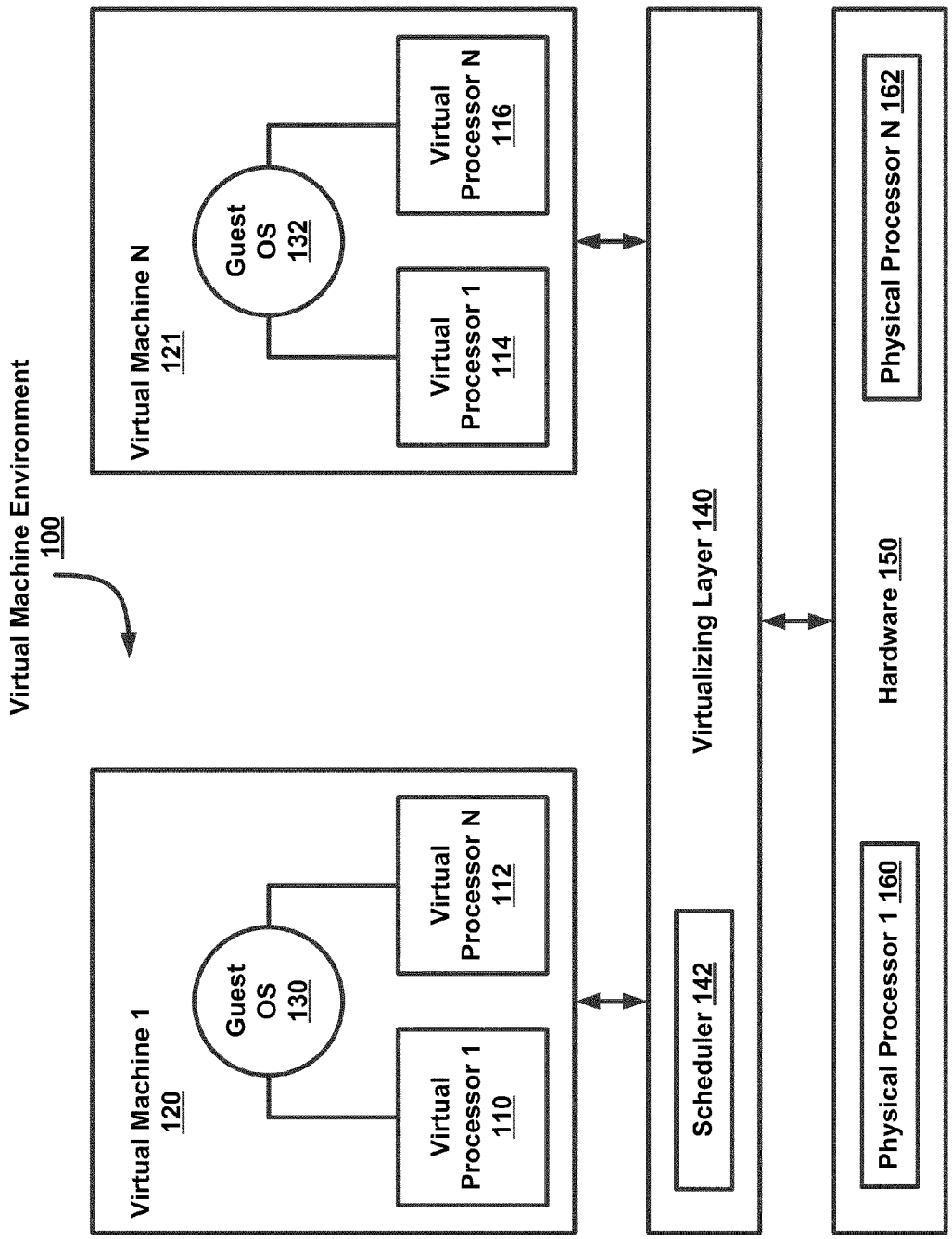
FIG. 1 illustrates a virtual machine environment, with a plurality of virtual machines.

Aspect of a computing environment in which the invention may have application is in virtualized computing. In such a virtualized computing environment, a plurality of virtual machines, each having an independent operating system, operate on the same underlying hardware. Access to the underlying physical hardware by each virtual machine is governed by a program that is sometimes referred to as a virtual machine monitor. A variations of a virtual machine monitor is referred to as a hypervisor. FIG. 1 illustrates a virtual machine environment 100, with a plurality of virtual machines 120, 121, comprising a plurality of virtual processors 110, 112, 114, 116, and corresponding guest operating systems 130, 132. The plurality of virtual processors 110, 112, 114, 116 can provide emulation of various hardware processors 160, 162 and architectures. The virtual machines 120, 121 are maintained by a virtualizing layer 140 (e.g., a hypervisor) which may have a scheduler 142 and other components (not shown). The virtualizing layer 140 mediates the access that virtual machines 120, 121 have to hardware 150.

In some instances, a user may desire to access computing applications remotely, i.e., applications that are running on a separate computing device. One implementation provides a user with such access through a remote desktop. A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a server, such as terminal server (TS). The application processes the input as if the input were entered at the server.

Figure 2:
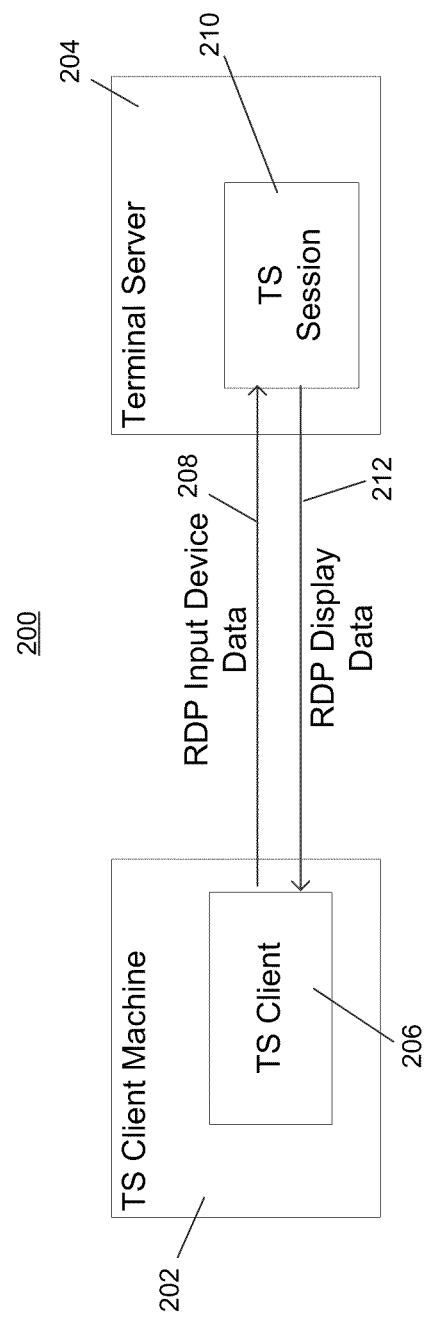
FIG. 2 depicts an operational environment for practicing aspects of the present disclosure.

FIG. 2 shows a diagrammatic overview of the operation of a remote access computing system 200. A TS client machine 202 and a TS 204 communicate using Remote Desktop Protocol (RDP). The TS client machine 202 runs a TS client process 206 that sends RDP input device data 208, such as for example keyboard data and mouse click data, to a TS session 210 that has been spawned on the TS and receives RDP display data 212, such as user interface graphics data. Generally, the TS client process 206 is a thin client process and most processing is provided on the TS 204.

When a remote desktop client connects to a terminal server via a terminal server gateway (not shown), the gateway may open a socket connection with the terminal server and redirect client traffic on the RDP port or a port dedicated to remote access services. The gateway may also perform certain gateway specific exchanges with the client using a terminal server gateway protocol transmitted over HTTPS.

During the TS Session 210, an application running in the session generates output in response to the received input 208 and the output 212 is transferred over the network to the TS client machine 202. The TS client machine 202 runs a TS client program that presents the output data. Thus, input is received and output presented at the TS client machine 202, while processing actually occurs at the terminal server 204. A session can include a shell and a user interface such as a desktop, the subsystems that track mouse movement within the desktop, the subsystems that translate a mouse click on an icon into commands that effectuate an instance of a program, etc. While an application is rendered, a desktop environment may still be generated and hidden from the user. It should be understood that the foregoing discussion is exemplary and that the presently disclosed subject matter may be implemented in various client/server environments and not limited to a particular terminal services product.

An example of a remote access system is Terminal Services™ systems provided by the Microsoft® Corporation. A Terminal Services™ system is discussed in the examples below; however, it is to be appreciated that the techniques discussed are applicable to other remote access systems such as Virtual Network Computing (VNC), Citrix XenApp, and the like.

In a further detailed illustration of a remote computing environment, a session broker controls the allocation of sessions to users communicating in a remote access system environment. A broker allocates a session to a user based on session state information stored in the broker. Session state information may include, for example, session IDs, user names, names of the servers where sessions are residing, the number of active sessions in each server computer, and so on. As used herein a session may be a virtual desktop session or a terminal services session.

In a remote access system environment, there may be more than one server computer that can service a particular user. As such there is a redirection process that determines where to send a request from a remote computing device that is attempting to connect to a server. In that instance, the remote computing device first connects to a redirector that provides load balancing, etc. of clients. In such a case, a redirection server typically first receives the request for a connection. The redirection server then accepts the connection request and queries the session broker to determine where the user can be redirected. The session broker analyzes the session state information of that particular environment and identifies a server to which the user can be redirected. The identified server may posses a session previously accessed by the user, but later disconnected, to which the user can be reconnected again. In an embodiment, an identified server may provide a new session to which the user can be connected, provided the user does not posses any other existing sessions.

The broker sends information to the requested server enabling the server to establish a connection with the identified server. For example, the information may include a machine ID, a session ID, and location of the identified server. The redirecting server analyzes the information received and redirects the user to the suitable server. Once the user establishes the connection with the identified server, the user can access applications present in the identified server. These applications may be compatible to the broker logic that was used in identifying the server from the terminal services environment.

The systems described above may be used to connect, for example, a client computer to one of a plurality of virtual desktops running on a server or to a session on a terminal server. The client computer examines a redirector token in a remote desktop protocol (RDP) packet. The client computer connects to one of the many virtual desktops based on information contained in the redirector token. Use of the redirector token enables integration of the session hosted with one or more virtual machines (VMs) (or terminal servers) with the existing terminal session deployment model. The client computer, using the token, can be appropriately directed to either a virtual desktop or terminal session.

In another embodiment, an RDP client computer is connected to one of the virtual desktops using a session broker and a pool manager. The session broker assigns the virtual desktops to the client computer when the client computers connected to a virtual desktop hosted on a VM, and the pool manager indicates which of the virtual desktops are available to be assigned.

In a further embodiment, the RDP client computer is connected to a virtual desktop. The RDP client computer indicates a network name that is used by the broker to generate an internet protocol (IP) address to establish connection between the client computer and the virtual desktops. By hiding the individual virtual desktop IP addresses from the RDP clients, only a single network name of the broker is initially required to be externally exposed to the clients. The construction of the virtual desktop and terminal services integration system and an environment in which this integration system may be enabled by techniques is set forth first below with reference to the figures.

Figure 3:
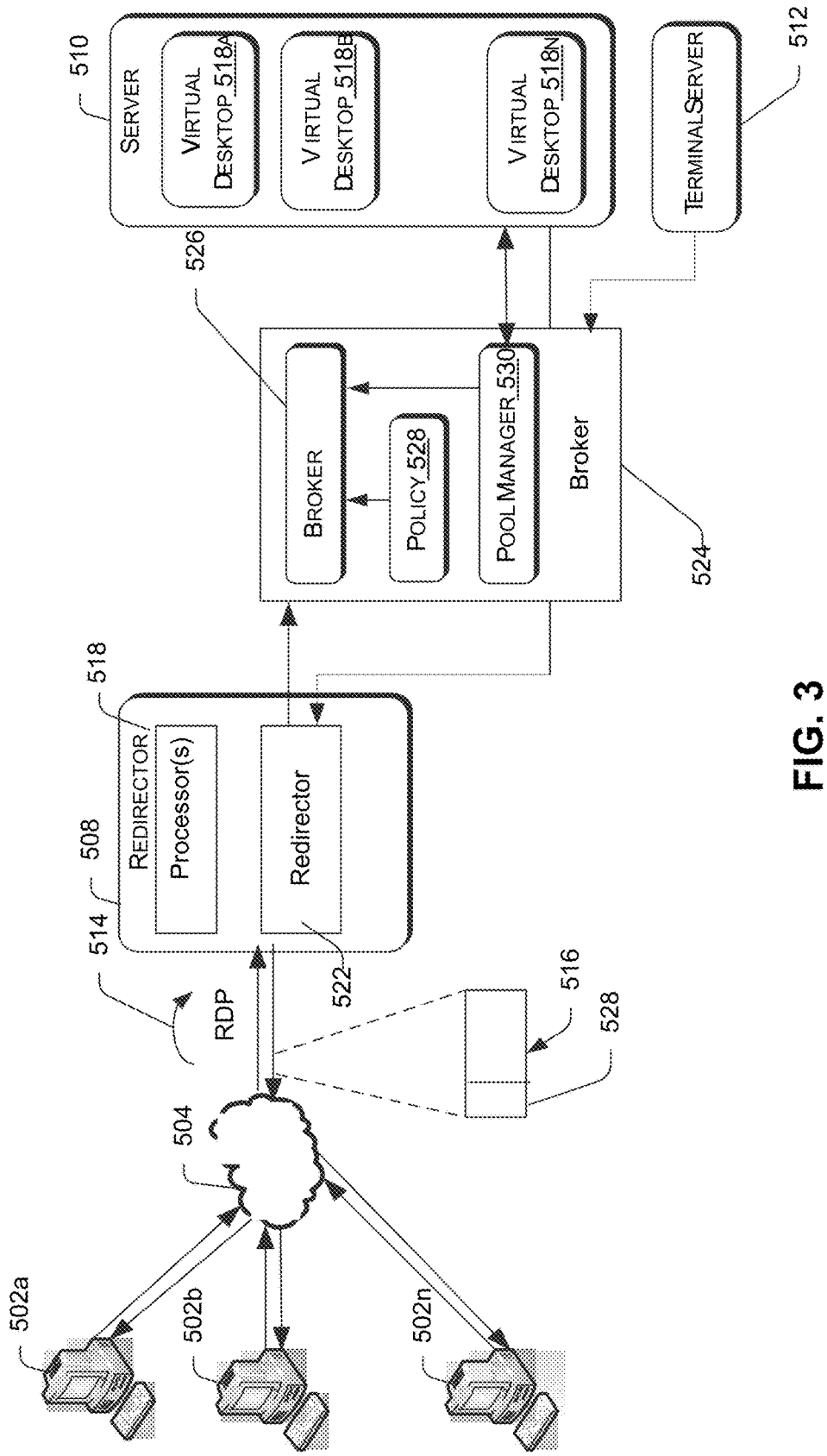
FIG. 3 illustrates an example system in which virtual desktops may be integrated with a terminal server for connecting with client devices.

FIG. 3 further illustrates an example embodiment of the system described above in which there is shown plurality of client devices 502(a-n) connected via network 504, redirector device 508 and broker 524 to virtual desktop server 510 and terminal server 512. In one embodiment, the redirector device 508 and the broker 524 are disposed on the same server. In another embodiment, a gateway (not shown) may be connected between redirector device 508 and network 504 or client devices 502(a-n).

Client devices 502(a-n) may be any computing device capable of communicating with a network 504, and are also referred to as terminal services clients. In one embodiment, the client devices 502(a-n) are general purpose desktop computing devices assigned to users (e.g., employees) that are connected to the wired network 504. Although the illustrated client devices 502(a-n) are depicted as a desktop PC, the client devices may be implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth. In one embodiment, client devices 502(a-n) transmit requests for content, send content and receive content using an RDP protocol 514. Client devices 502(a-n) receive content in an RDP packet 516 format from redirector device 508.

Network 504 may be any type of communications network, such as a local area network, wide area network, cable network, the internet, the World Wide Web or a corporate enterprise network. Content is transmitted from and received by client devices 502(a-n) in a packetized format via network 504 for delivery to and from redirector device 508.

Redirector device 508 includes a processor 518. Included in memory (not shown) may be a redirector module 522. Broker module 524 includes a session broker module 526, a policy module 528 and a pool manager module 530. Broker module 524 may be disposed in a server, such as server 510, may be disposed in a standalone server or may be disposed within redirector device 508.

Server 510 includes a plurality of virtual desktops 518(a-n), generally known as virtual machines. Although the illustrated virtual desktops 518(a-n) are shown as a blade within 510 server, the virtual desktops 518(a-n) may be individually implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth. Redirector 522 receives RDP packets from clients 502(a-n) and incorporates those packets for delivery to broker module 524. Redirector 522 also transmits requests from broker module 524 to establish a connection between one of virtual desktops 518(a-n) and client devices 502(a-n). Such requests are received in broker 524 by session broker 526. Broker 524 also receives from server 550 an indication of which virtual desktops 518(a-n) are available.

Session broker 526 also receives a policy indication from policy module 528 indicating criteria for selection of virtual desktops 518(a-n). Session broker 526 then provides an indication to redirector 522 indicating which one of the virtual desktops 518(a-n) are available for connection to one of the client devices 502(a-n). In one embodiment, session broker 526 may indicate that one of client devices 502(a-n) may connect to terminal server 512. The redirector 522 feeds a packet 516 to one of client devices 502(a-n) containing a redirection token 528, indicating an IP address of the virtual desktop. Also the redirector 522 sends an indication of connection to one of client devices 502(a-n), but, in one embodiment, does not expose the IP address of the virtual desktop that the client device is connected. In this embodiment, the re-director maintains a list of the names of the virtual desktops indicated by each of the client devices 502(a-n) and the corresponding IP address of the virtual desktop 518. Thus when a connection name is provided with the request, the re-director 522 establishes a connection between one of the client devices 502(a-n) with the corresponding virtual desktop 518. In another embodiment, redirector 508 may supply the IP address of the virtual desktop to the client device 502 along with the name of the virtual machine so that client device 502 may directly connect and authenticate to the virtual desktop.

Figure 4:
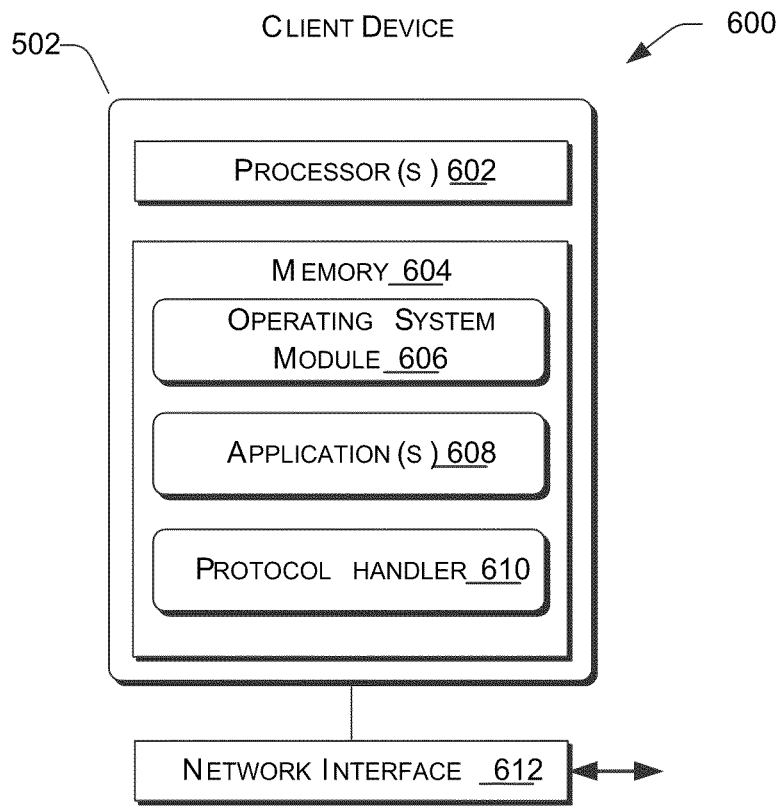
FIG. 4 illustrates a block diagram depicting selected modules in a client computer.

FIG. 4 depicts a block diagram 600 illustrating selected modules in one of client devices 502(a-n) (herein referred to as client device 502) of the integration system 500.

The client device 502 has process capabilities and memory suitable to store and execute computer-executable instructions. In this example, client device 502 includes one or more processors 602, memory 604 and is coupled with network interface 512. The memory 604 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 604 are operating system module 606, application(s) 608, and RDP protocol handler module 512. The modules may be implemented as software or computer-executable instructions that are executed by the one or more processors 602.

The operating system module 606 contains an operating system that may enable the other modules of the client device 502 to receive, process, and exchange data. In addition, the operating system module 606 may also enable the client device 502 to communicate with other devices across a network 504 using network interface 512.

Figure 5:
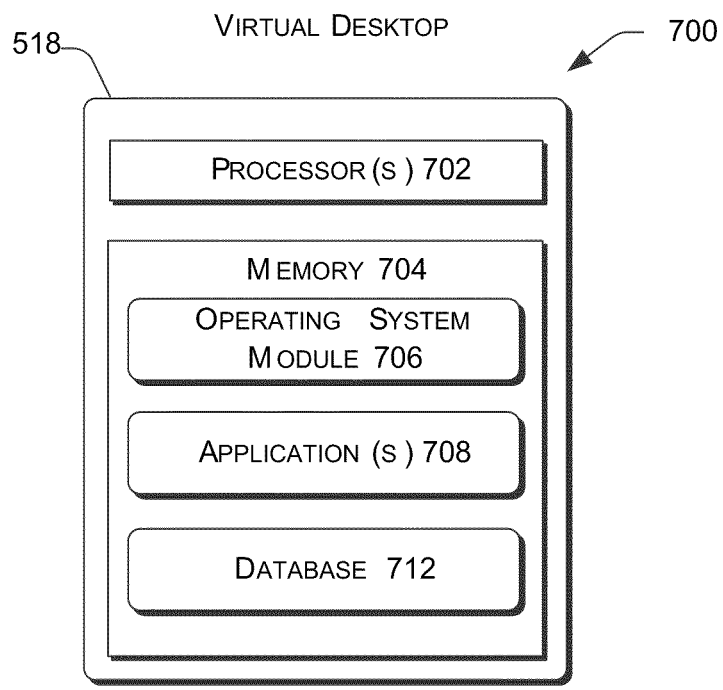
FIG. 5 illustrates a block diagram depicting selected modules in a virtual desktop.

FIG. 5 depicts a block diagram 700 illustrating selected modules in one of virtual desktops 518(a-n) (herein referred to as virtual desktop 518) of the integration system 500. Virtual desktop 518 preferably operates in a virtual machine in a virtualized environment and executes on a server with a plurality of other virtual desktops.

The virtual desktop 518 has process capabilities and memory suitable to store and execute computer-executable instructions. In this example, virtual desktop 518 includes one or more processors 702 (which in the case of a virtual machines system would be virtual processors) and memory 704.

Stored in memory 704 are operating system module 706, one or more application(s) 708, and database 712. The modules may be implemented as software or computer-executable instructions that are executed by the one or more processors 702.

The operating system module 706 contains an operating system that may enable the other modules of the virtual desktop 518 to receive, process, and exchange data. In addition, the operating system module 706 may also enable the virtual desktop 702 to communicate with other devices via redirector device 508.

Figure 6:
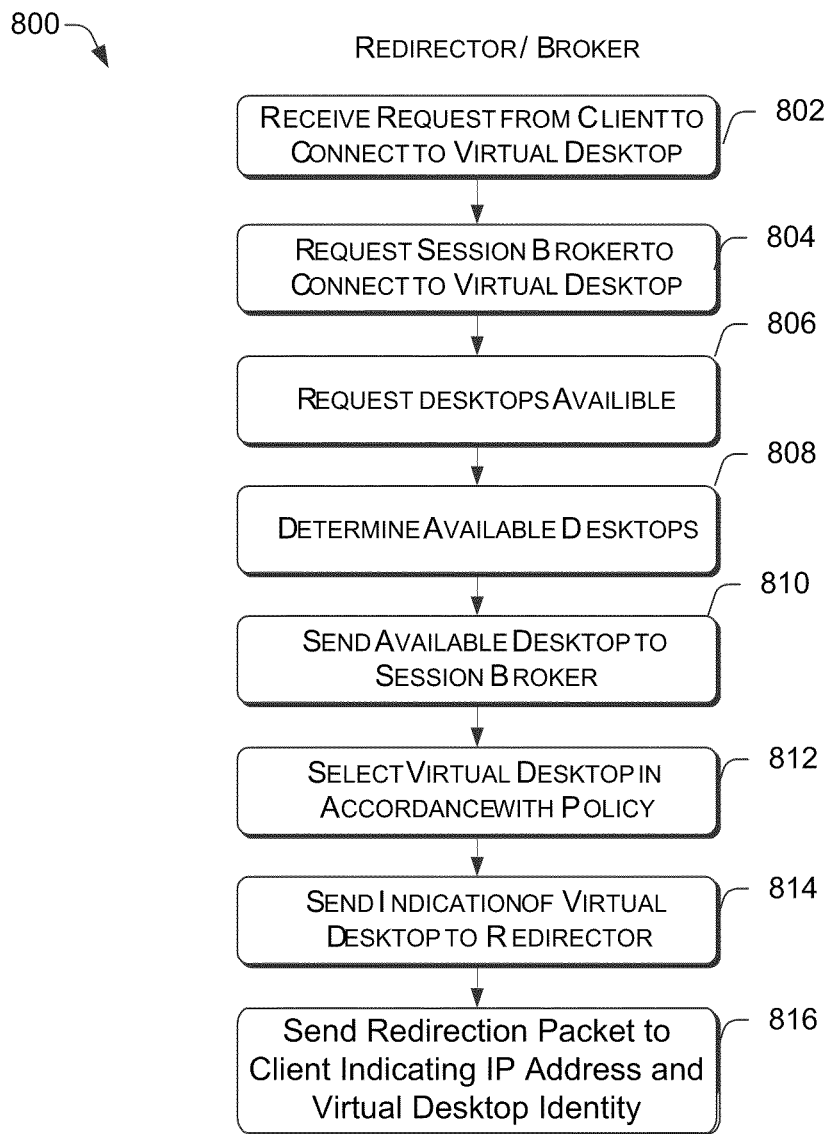
FIG. 6 illustrates a flow diagram of an exemplary process operating on a redirector/broker device for connecting and transferring content between a client device and the virtual desktop.
Figure 7:
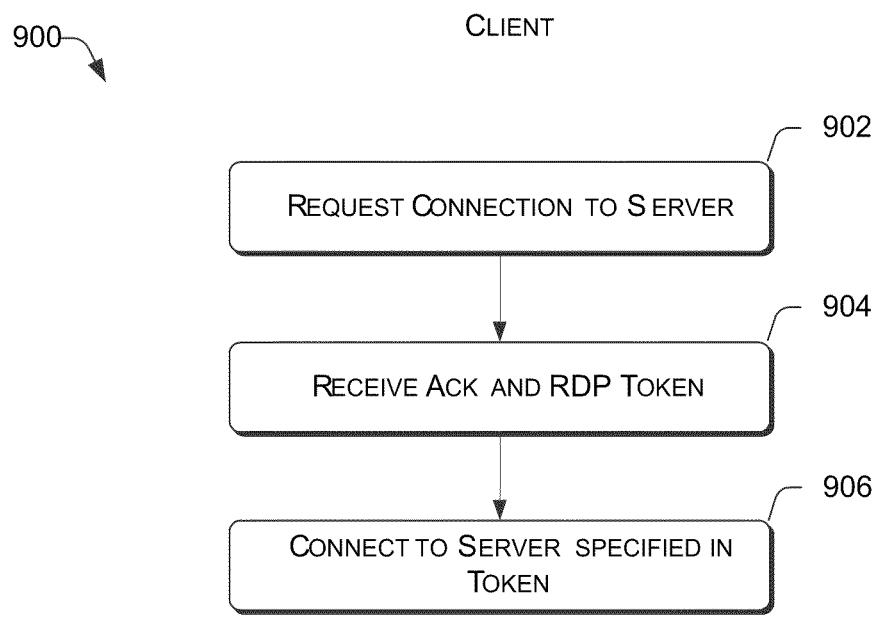
FIG. 7 illustrates a flow diagram of an exemplary process executed with a client device for connecting and transferring content between the client device and the virtual desktop.
Figure 8:
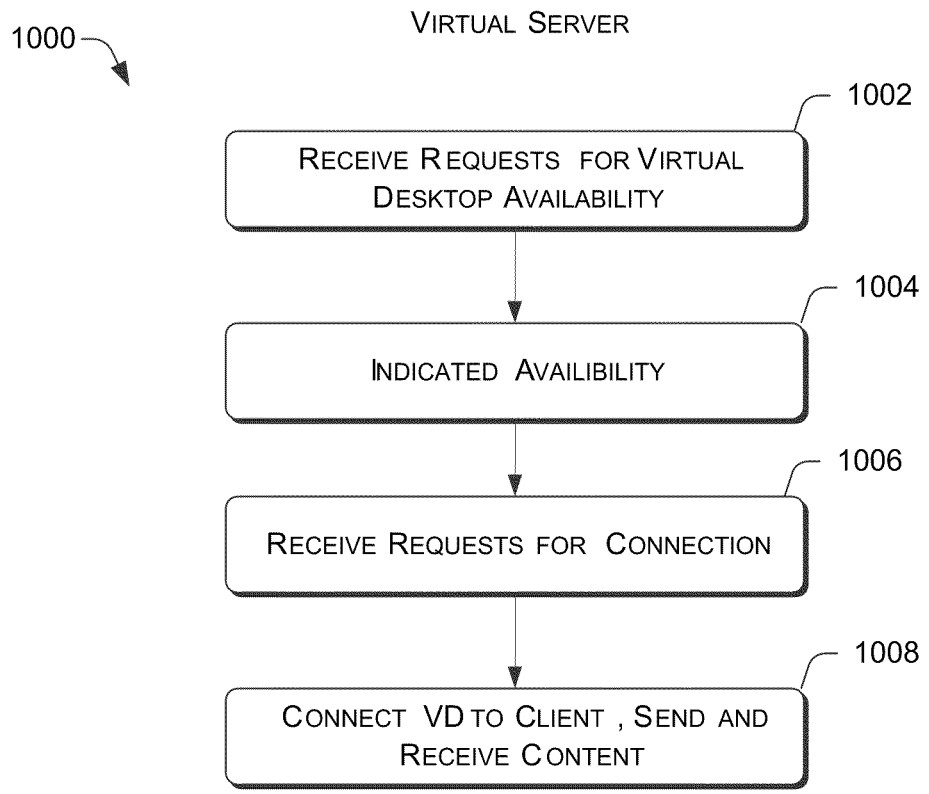
FIG. 8 illustrates a flow diagram of an exemplary process executed with a server device for connecting and transferring content between the client device and the virtual desktop.

The flow diagram in FIG. 6 depicts exemplary processes 802-828 used by processor 518 (see FIG. 3) in redirector device 508 and broker 124 (see FIG. 3), and represents a sequence of operations that can be implemented in hardware, software, and a combination thereof. The flow diagram in FIG. 7 depicts exemplary processes 502-506 used by processor 602 (see FIG. 4) in client device 502 (see FIGS. 3 and 4), and also represents a sequence of operations that can be implemented in hardware, software, and a combination thereof. The flow diagram in FIG. 8 depicts exemplary processes 602-608 used by processor (not shown) in server 510 (see FIG. 3), and additionally represents a sequence of operations that can be implemented in hardware, software, and a combination thereof. In the context of software, the blocks represent computer-executable instructions that, when executed by one or more processors, perform the recited operations.

Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIGS. 3 and 5, although it may be implemented in other system architectures.

FIG. 6 illustrates a flow diagram of an exemplary process 800 used by a redirector device 508 and broker 524 to connect client device 502 with a virtual desktop 518 or terminal server 552. At block 802, a request is received from the client device 502 to connect to one of the virtual desktop 518(a-n). The request may include the name of the requesting client device and a name of the virtual desktop. Such a request is received by the redirector 522 and is sent to session broker 526 in block 804. In block 806, the session broker transmits a request to pool manager 530 requesting available virtual desktops. In block 808, the pool manager 530 determines which virtual desktops 518(a-n) are available, by polling the virtual desktops or by reading a table stored in memory that tracks the virtual desktop availability. In one embodiment, the pool manager 530 may determine that the terminal server 552 is available for transmitting and receiving content. In block 810 pool manager 530 provides a notification of virtual desktop availability to session broker 526.

In block 812, the session broker 526 reads a table in policy module 528 indicating which of the virtual desktops 518(a-n) may be used with a particular client device 502. Such elements of the table may be set by an administrator. In accordance with the table, the virtual desktop 518 is selected and the IP address for the virtual desktop 518 is provided to redirector 522 in block 814. Redirector 522 then stores the IP address and the corresponding name provided by the client device 502. In block 816, a connection is established by feeding an acknowledgment of the connection request to client device 502.

Once the connection is established, in block 818 the redirector device 508 then receives content during a session from either one of the virtual desktops 518(a-n) or one of the client devices 502(a-n). In block 820, the origin of the content is determined. If the content originates from one of the virtual desktops 518(a-n) in server 510, in block 824 the redirector 522 feeds retrieved content to the client device 502 If the content originates from one of the client devices 502(an), in block 826 the redirector 122 reads the address for the device originating the content, and feeds the client content using redirector device 508 to the corresponding virtual desktop 518 (or terminal server 512) in block 828.

FIG. 7 illustrates a flow diagram of an exemplary process 900 used by client device 502 to connect with a virtual desktop 518 or terminal server 512. At block 902, a request is made by the client device 502 to connect to one of the virtual desktops 518(a-n). In one embodiment, the request may be made by the device 502 to connect with the terminal server 512. In block 904, the client device 502 may receive and acknowledgment that it is connected to the virtual desktop. Once it is connected, client device 502 may start a session by transmitting or receiving data from the virtual desktop 518. In one embodiment, a token may be received from the redirector device 508 in the RDP packet indicating an IP address and a name of the virtual desktop that the client device 502 will use for connecting to and authenticating with a virtual machine. In block 906, the client device may indicate that name when connecting to the virtual desktop 518. In another example, the name and address may correspond to an IP address of terminal server 512.

FIG. 8 illustrates a flow diagram of an exemplary process 1000 used by server 510, e.g. a VM host, to initiate a connection to client device 502. At block 1002, the server 510 receives requests for virtual desktop 518 availability. In block 1004, the server 510 polls its virtual desktops, and feeds an availability indication to server 508. In block 1006, the server 510 receives requests for connection between one of the virtual desktops 518 and one of the client devices. The request may include the IP address of the requested virtual desktop. In block 1008, server 510 indicates that a connection has been established. Further, server 510 both sends content to and receives content from the client device 502.

Figure 9:
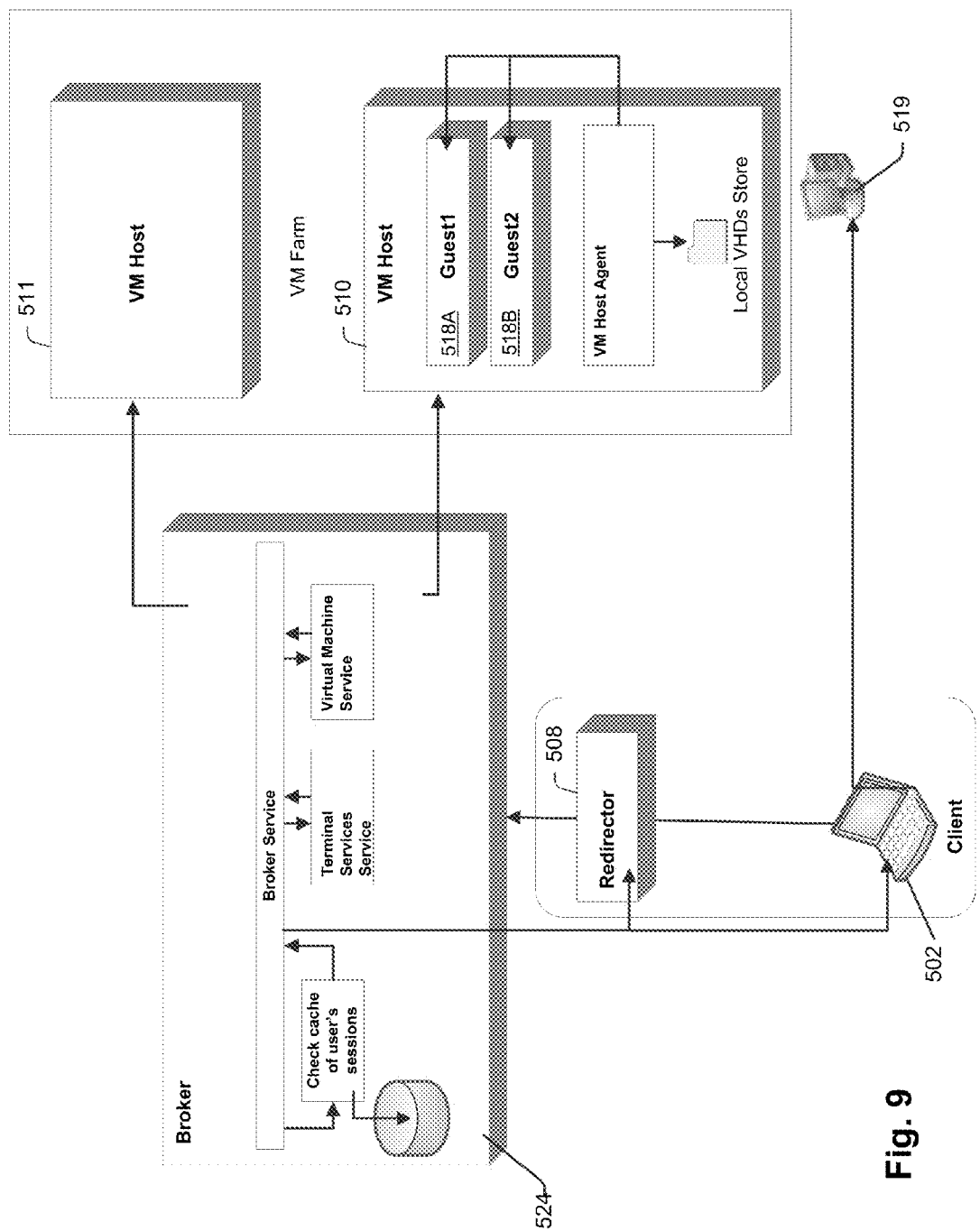
FIG. 9 illustrates a block diagram illustrating an exemplary network architecture for leveraging a remote access system session broker infrastructure.
Figure 10:
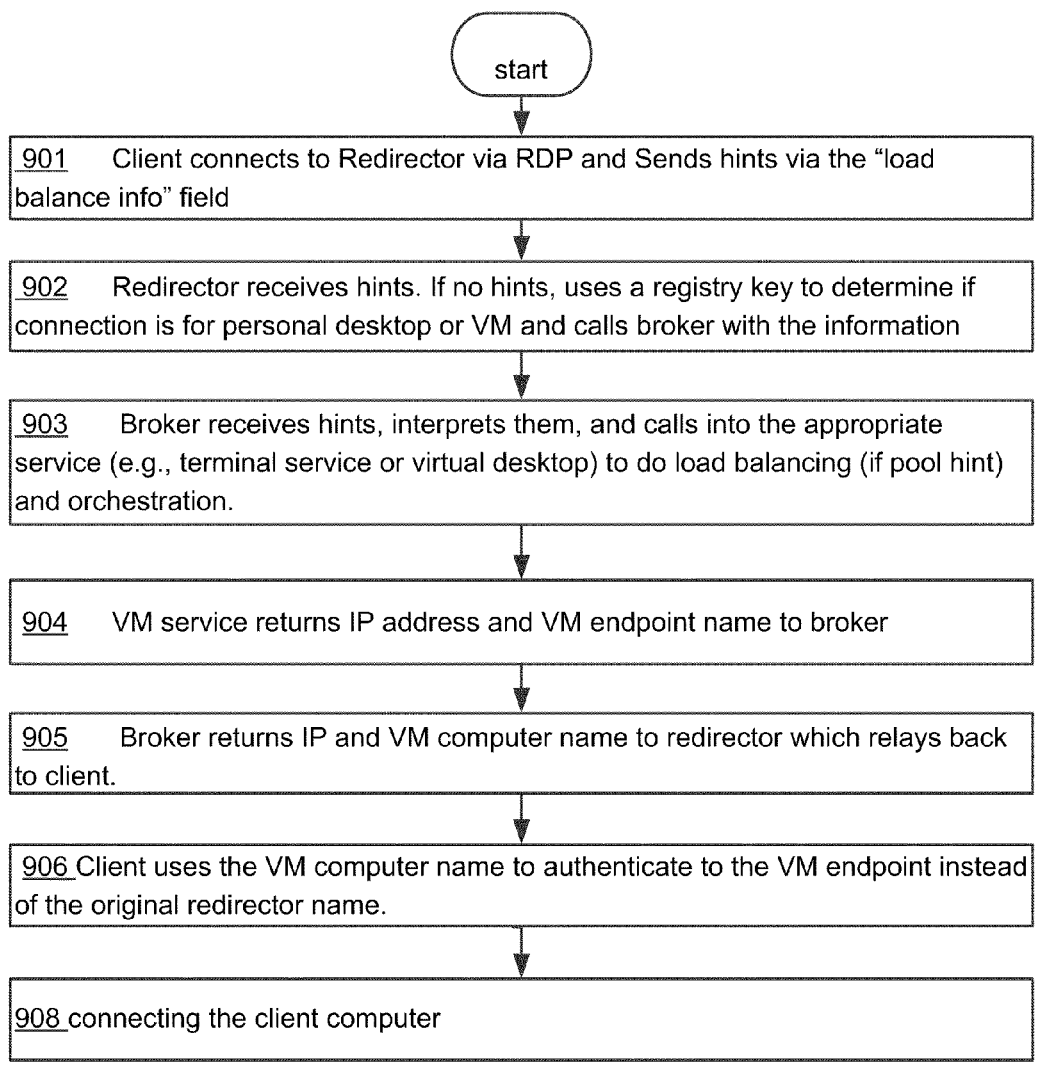
FIG. 10 illustrates a flow chart illustrating an example method for leveraging a remote access system session broker infrastructure.
Figure 11:
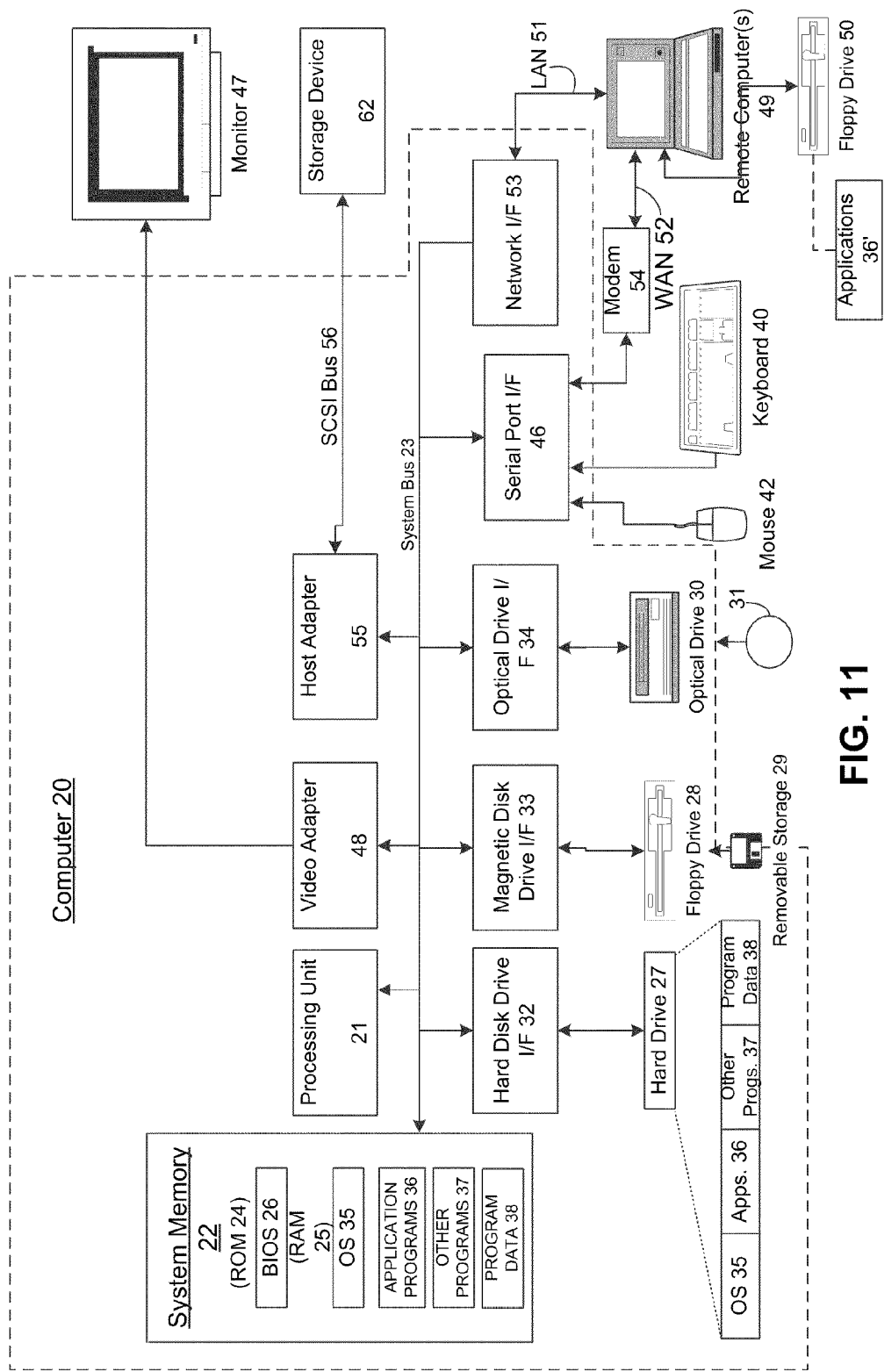
FIG. 11 depicts an example computer system.

As noted previously, a user may disconnect from a session or virtual desktop while the session or virtual desktop is still active. When the user reconnects to that session or virtual desktop, the user expects the system to be in the previous state. Consequently, when a user reconnects after disconnecting from a session or virtual desktop, the redirector and broker must locate the previous session so that the user can properly reconnect. The flow chart of FIG. 10 further illustrates aspect of the system described with reference to the system of FIG. 9 and further illustrates aspects of the invention when a user attempts to connect to a virtual desktop.

Initially, at block 901, client 502 connects to redirector 508 using an RDP file. The RDP file contains a field called "load balance info" that client 502 sends to redirector 508. In this instance, the field is overloaded to specify whether the user wants a personal desktop (PD) or VM pool. In previous embodiments, the client did not need to provide this indication of which VM pool it intends to connect to, since each VM pool had its own unique Redirector. By connecting to a specific Redirector associated with a particular VM Pool, client was implicitly choosing the VM pool to connect to. For example, Terminal Server farm brokering in Windows Server uses such a technique. If a VM pool, and the server that maintains that virtual machine needs to be determined. Since the hints contain enough information about PD and/or pool name, there is no need for a separate redirector per pool as in traditional remote desktop session host cases. A single redirector can serve all virtual desktop connections.

At block 902, redirector 508 receives the "load balance info" (also referred to herein as hints). If the "load balance info" is not present, the redirector looks up in a pre-configured registry to determine the hints. The latter case is used by a thin client that does not use RDP files yet wants to establish a virtual desktop connection. Redirector 508 then calls broker 524 and passes the hints. Preferably, redirector 508 does not interpret the hints.

At block 903, broker 524 receives the hints, interprets them, and determines whether the connection is for a PD or pool/pool name. Based on this information, it calls into the appropriate service to obtain a PD or does load balancing.

At block 904, the VM service, which is called for orchestration or waking up of the VM, returns the actual endpoint name (e.g. virtual machine name) in addition to the IP address.

At block 905, broker 524 returns the IP address and end point name to redirector 508 which relays it back to client 502.

At block 906, client 502 receives these two variables, IP address and end point name. Client 502 then uses the IP address to connect to the VM directly (the endpoint is depicted as computing device 519 in FIG. 9 for clarity). However, in order to authenticate the VM, it uses the endpoint name returned by broker 524 and not the redirector name. This eliminates the need for a complex certificate deployment on each individual VM that matches the name of the redirector to achieve server authentication, and also eliminates the failure in connections when such certificates are not deployed.

Any of the above mentioned aspects can be implemented in methods, systems, computer readable media, or any type of manufacture. For example, a computer readable medium can store thereon computer executable instructions for connecting a remote client computer to one of a plurality of virtual machines executing on a plurality of servers.

As described above, aspects of the presently disclosed subject matter may execute on a programmed computer. FIG. 1 and the following discussion is intended to provide a brief description of a suitable computing environment in which the those aspects may be implemented. One skilled in the art can appreciate that the computer system of FIG. 1 can in some embodiments effectuate the server and the client of FIGS. 2-4. In these example embodiments, the server and client can include some or all of the components described in FIG. 1 and in some embodiments the server and client can each include circuitry configured to instantiate specific aspects of the present disclosure.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 1 depicts an example of a computing system which is configured to with aspects of the disclosed subject matter. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosed subject matter may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the presently disclosed subject matter are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the subject matter described herein have been shown and described, it will be apparent to those skilled in the art that, based upon the teachings herein, changes and modifications may be made and, therefore, the appended claims are to encompass within their scope all such changes and modifications as are within the true spirit and scope of the subject matter described herein.

What is claimed:

1. A method for enabling connections between a client computer and a virtual machine capable of executing on one of a plurality of servers, comprising:
   receiving, at a first server, a request for a virtual desktop connection, the request on behalf of a user from the client computer and comprising information indicative of connecting to the virtual desktop directly;
   determining, at a broker module on the server, whether the requesting user has a preexisting virtual desktop session hosted on a previous virtual machine session, and whether a virtual machine is currently available for connection, wherein the broker module maintains a cache of user sessions based on information received from the plurality of servers, said cache allowing the broker module to track preexisting virtual machine sessions;
   identifying a current internet protocol (IP) address for the previous virtual machine session based at least in part on the information included in the request for the virtual desktop connection, the IP address having changed from a previous IP address, and the virtual machine's availability; and
   returning said current IP address along with a name of the virtual machine to the client computer in order for the client computer to authenticate a connection with the virtual machine.

2. The method of claim 1, wherein determining whether the requesting user has a remote desktop session associated with a previous virtual machine session is determined by checking a cache of user sessions.

3. The method of claim 1, further comprising interpreting information received from the client computer to determine whether the user is requesting a personal desktop or virtual machine pool.

4. The method of claim 1, wherein the first server tracks user sessions by way of information received from a server hosting the virtual machine.

5. The method of claim 4, further comprising communicating to the server hosting the virtual machine in order to initiate the virtual machine.

6. The method of claim 1, comprising receiving from the client computer a name associated with a virtual machine farm.

7. A system adapted to connect a client computer to one of a plurality of virtual machines executing on a plurality of servers, comprising:
   at least one computing device comprising a processor; and
   at least one memory communicatively coupled to said at least one computing device when the system is operational, the memory having stored therein computer-executable instructions that when executed cause:
   a redirector code module to send a request for a redirection packet upon receiving a request for a virtual desktop connection from the client computer on behalf of a user;
   a broker code module to receive the request for a redirection packet and to determine an internet protocol (IP) address corresponding to a selected virtual machine hosted on a server to which the user has a preexisting virtual desktop session based at least in part on information included in the request for the virtual desktop connection and a determination of the virtual machine's availability for connection, wherein the broker code module maintains a cache of user sessions based on information received from the plurality of servers, said cache allowing the broker code module to track preexisting virtual machine sessions;
   the broker code module to send a name corresponding to the selected virtual machine and a redirection packet comprising the internet protocol (IP) address and a redirection token; and
   the redirector code module to receive the redirection token from a client; and
   the redirector code module to establish communication between the client and the selected virtual machine, based on the redirection token.

8. The system of claim 7 wherein the selected virtual machine is executing on a server farm.

9. The system of claim 7 wherein the memory having stored therein computer-executable instructions that when executed further cause the redirector code module to effect the server to restore the selected virtual machine for execution.

10. The system of claim 9, wherein the memory having stored therein computer-executable instructions that when executed further cause the broker code module to communicate to the server hosting the selected virtual machine in order to initiate the virtual machine.

11. The system of claim 7 wherein the memory having stored therein computer-executable instructions that when executed further cause the broker code module to check a cache of user sessions for the preexisting virtual desktop session.

12. The system of claim 11, wherein the memory having stored therein computer-executable instructions that when executed further cause the broker code module to track user sessions by way of information received from a server hosting the virtual machine.

13. The system of claim 7, wherein the communication between the client and the selected virtual machine uses Remote Desktop Protocol (RDP).

14. A computer-readable storage memory storing thereon computer executable instructions for enabling connection of a remote client computer to one of a plurality of virtual machines executing on a plurality of servers, comprising instructions for:

receiving, at a first server, a request for a connection to a virtual desktop hosted on a virtual machine, the request from a user of the remote client computer and comprising information indicative of connecting to the virtual desktop directly;

determining, at a broker module on the server, whether a previous virtual desktop session was hosted on a virtual machine session for the user, and whether the virtual machine is currently available for connection, wherein the broker module maintains a cache of user sessions based on information received from the plurality of servers, said cache allowing the broker module to track preexisting virtual machine sessions;

identifying an internet protocol (IP) address and an associated virtual machine name for the virtual machine running the previous virtual machine session based at least in part on the information included in the request for the virtual desktop connection and the virtual machine's availability;

sending acknowledgement of the request to the remote client computer;

receiving content from a virtual desktop; and feeding the received content to the remote client computer.

15. The computer-readable storage memory of claim 14, wherein determining whether the requesting user has a previous virtual machine session comprises checking a cache of user sessions.

16. The computer-readable storage memory of claim 14, further comprising instructions for tracking user sessions by way of information received from a server hosting the virtual machine.

17. The computer-readable storage memory of claim 16, further comprising instructions for communicating to the server hosting the virtual machine in order to initiate the virtual machine.

18. The computer-readable storage memory of claim 14, further comprising instructions for receiving from the client computer a name associated with a virtual machine farm.

19. The computer-readable storage memory of claim 17, wherein the instructions for communicating to the server comprise computer-readable instructions that conform to a Remote Desktop Protocol (RDP).

\* \* \* \* \*